United States Patent [19]

Martin

[11] Patent Number: 4,886,305

[45] Date of Patent: Dec. 12, 1989

[54] DOUBLE CONTAINMENT PIPE FITTINGS AND APPARATUS TO ADHESIVELY INSTALL THE SAME

[75] Inventor: Carl E. Martin, Sand Springs, Okla.

[73] Assignee: Fibercast Company, Sand Springs, Okla.

[21] Appl. No.: 231,361

[22] Filed: Aug. 12, 1988

[51] Int. Cl.[4] ............................................. F16L 39/00
[52] U.S. Cl. ................................... 85/133.1; 285/138; 285/350; 285/915; 285/179
[58] Field of Search ................... 285/133.1, 47, 138, 285/139, 179, 156, 155; 285/350, 915, 55, 45

[56] References Cited

U.S. PATENT DOCUMENTS

| | | | |
|---|---|---|---|
| 1,909,075 | 5/1933 | Ricker et al. | |
| 2,031,849 | 2/1936 | O'Leary | 285/138 |
| 2,401,974 | 6/1946 | Siebels | 138/76 |
| 2,475,635 | 7/1949 | Parsons | 138/65 |
| 2,650,112 | 8/1953 | Kinkead | 285/133.1 X |
| 2,696,835 | 12/1954 | Kaiser | 285/138 X |
| 2,895,512 | 7/1959 | Forsyth et al. | 138/87 |
| 3,065,807 | 11/1962 | Wells | 175/321 |
| 3,208,539 | 9/1965 | Henderson | 175/215 |
| 3,489,438 | 1/1970 | McClure | 285/133 |
| 3,503,635 | 3/1970 | Cheatwood | 285/138 |
| 3,546,356 | 12/1970 | Graybill | 285/133.1 X |
| 3,721,270 | 3/1973 | Wittgenstein | 138/104 |
| 3,980,112 | 9/1976 | Basham | 141/392 |
| 4,127,286 | 11/1978 | Albertsen | 285/41 |
| 4,149,739 | 4/1979 | Morris | 285/133 |
| 4,422,675 | 12/1983 | Norris et al. | 285/45 |
| 4,441,743 | 4/1984 | Steenbergen | 285/21 |
| 4,514,244 | 4/1985 | Shaefer et al. | 285/179 X |
| 4,694,865 | 9/1987 | Tauschmann | 138/148 |
| 4,732,414 | 3/1988 | Inaba | 285/133.1 |
| 4,754,782 | 7/1988 | Grantham | 285/133.1 X |
| 4,786,088 | 11/1988 | Ziu | 285/138 |

Primary Examiner—Randolph A. Reese
Assistant Examiner—Paul Frechette
Attorney, Agent, or Firm—Robert B. Stevenson

[57] ABSTRACT

A double containment restraint pipe fitting of fiber reinforced plastic and centrifugally cast pipe comprising an outer containment housing and a coaxially positioned inner carrier housing having coaxially positioned segment of containment pipe and carrier pipe adhesively bonded at each opening of the fitting and a rigid centering ring adhesively bonded to each pipe segment and occupying the annular space therebetween at each opening of the fitting. A make-up fitting for adhesively closing the exterior confinement pipe during installation, assembly and/or repair is also provided.

11 Claims, 3 Drawing Sheets

DOUBLE CONTAINMENT PIPE FITTINGS AND APPARATUS TO ADHESIVELY INSTALL THE SAME

BACKGROUND OF THE INVENTION

1. Field of the Invention

The present invention relates to double containment pipe fittings and an apparatus to adhesively install the same. More specifically, the present invention relates to restraint elbows, lateral and T fittings of fiber reinforced single carrier double containment pipe and an adhesive make-up coupling for the same.

2. Description of the Prior Art

The general concept of providing a double or dual containment pipe system wherein an inner carrier pipe is concentrically located within an outer containment pipe to deliver dangerous or hazardous fluids is well known and an accepted commercial practice. Historical applications for such systems have been found in the nuclear, gas petroleum production and refining and chemical processing industries. The inner pipe is used to transport the hazardous or toxic fluid while the outer pipe is present to confine any leaks. Thus, it is also known to provide the annulus between the concentric pipes with various types of detectors and/or drainage apparatus to handle leakage.

With the advent of stricter governmental regulation concerning the piping of petroleum products, the anticipated increased use of various types of plastic pipes in double containment applications is a certainty. As such, methods of constructing fittings and method of installing and repair of plastic double confinement pipes containing such fittings is necessary.

SUMMARY OF THE INVENTION

The present invention provides novel double containment fittings that are categorically restraint fittings in that the outer containment pipe and inner carrier pipe are held or restrained in a compression/tension mode at each fitting. Preferably, the fittings are manufactured of fiber reinforced plastic and are entirely adhesively bonded to fiber reinforced concentrically cast coaxial double containment pipe. The present invention further provides a make-up fitting or apparatus to adhesively install such fittings either during original assembly or during subsequent repair.

Thus, the present invention provides a double containment fitting comprising:

(a) an outer containment housing with a plurality of open ends wherein the internal diameter of each of the open ends are sized such as to accept and adhesively bond to segments of external containment pipe;

(b) an inner carrier housing with a plurality of open ends adapted to insert within and coaxially align with the outer containment housing and wherein said plurality of open ends of the inner carrier housing are sized such as to accept and adhesively bond to segments of inner carrier pipe when positioned coaxial to external containment pipe;

(c) a plurality of external containment pipe segments adhesively bonded to each of the plurality of open ends of the outer containment housing; and (d) a plurality of rigid centering ring means, one for each of the plurality of external containment pipe segments, for adhesively bonding the outer containment housing and external containment pipe to the inner carrier housing and inner carrier pipe, thus producing a restraint fitting.

The present invention further provides for one or more inner carrier pipe segments, each adhesively bonded to one of the plurality of open ends of the inner carrier housing. Also, the rigid centering ring means can have an opening there through to establish fluid communication from the annulus between the outer containment housing and the inner carrier housing to the annulus between the external containment pipe segment and inner carrier pipe segment.

The present invention further provides a make-up fitting comprising:

(a) a make-up pipe segment adapted to adhesively bond at one end to one of the external containment pipe segments and further internally sized and adapted at the other end to accept and adhesively bond to another section of external containment pipe, wherein the outer diameter of the other end is externally threaded and (b) a compression nut means for slipping over the external containment pipe section and threadably engaging to the threaded other end of the make-up pipe and for receiving and compressively advancing adhesive into and between the other end of the make-up pipe and the section of external containment pipe as the compression nut means is threaded onto the threaded other end of the make-up pipe.

It is an object of the present invention to provide a double containment fitting system for use with fiber reinforced plastic pipe and the like that result in a predominantly all adhesively bonded system. It is a further object of the present invention to provide such a double containment fitting that holds the outer containment pipe and the inner carrier pipe under a compression/tension restraint at each fitting. It is still a further object of the present invention to provide a make-up fitting that allows for simple and quick assembly during installation or repair of the double containment pipe system using these restraint fittings. Fulfillment of these objects and the presence and fulfillment of other objects will be apparent upon complete reading of the specification and claims when taken in conjunction with the attached drawings.

DESCRIPTION OF THE PREFERRED EMBODIMENTS

Figure 1:
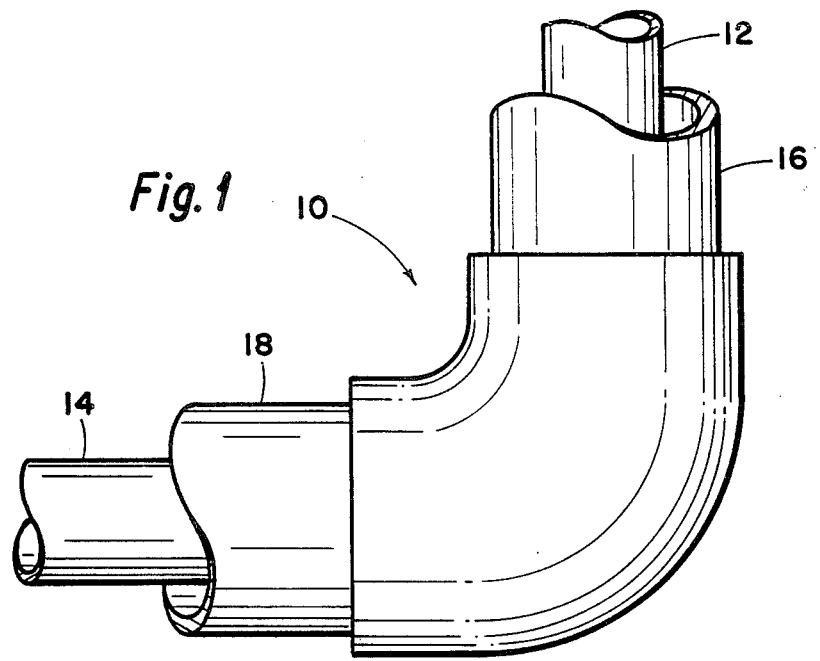
FIG. 1 is a partial cut-away side elevational view of a 90° elbow according to the present invention installed in a double containment pipe system.

The double containment, restraint fitting according to the present invention, how it is manufactured and the benefits of its use as well as the use of the make-up fitting according to the present invention for installing and repairing the double containment pipe fittings can perhaps be best explained and understood by reference to the drawings. FIG. 1 illustrates a 90° elbow fitting, generally designated by the numeral 10, installed to inner pipe sections 12 and 14 which are concentrically surrounded in a coaxial configuration by external containment pipe sections 16 and 18.

Figure 2:
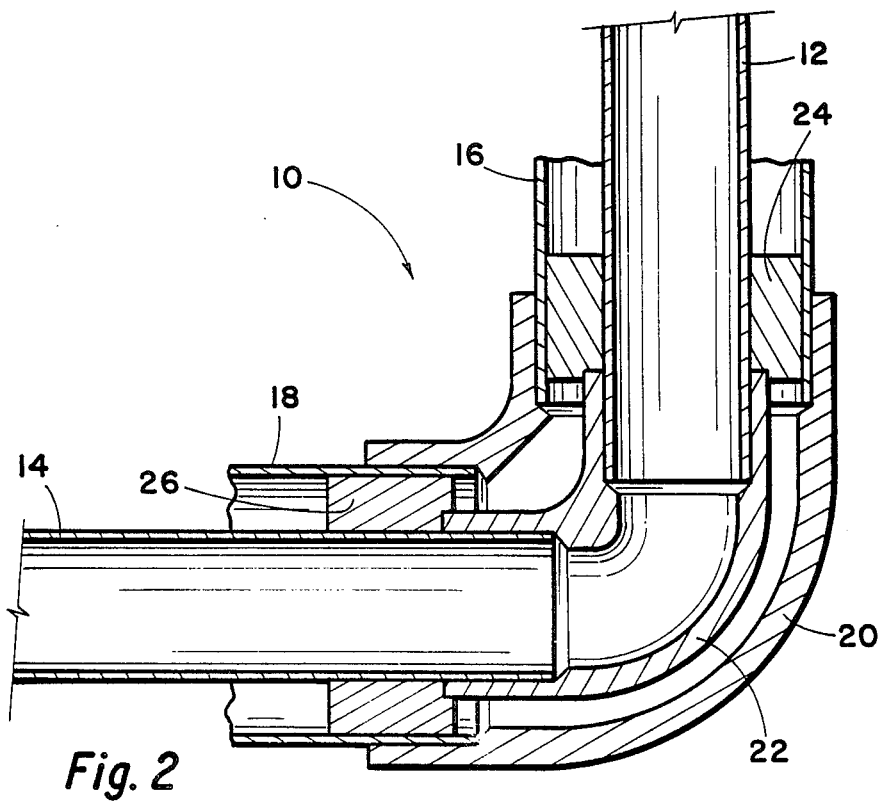
FIG. 2 is a cross-sectional side view of the 90° elbow and double containment pipe system of FIG. 1.

As illustrated in the cross-sectional view of FIG. 2, the double containment 90° elbow 10 consists of an outer containment housing 20 and an inner carrier housing 22, each in the form of a 90° elbow symmetrically and coaxially aligned. The inner pipe sections 12 and 14 are adhesively bonded to the respective ends of the inner carrier housing 22. Similarly, the external containment pipe sections 16 and 18 are adhesively bonded to the opposite ends of the outer containment housing 20. A pair of structurally rigid centering rings 24 and 26 are employed, one at each end of the fitting 10, to hold the outer containment housing 20 and inner carrier housing 22 in a coaxial configuration. The rigid centering rings 24 and 26, in this particular illustrated embodiment, are adhesively bonded to the outer surface of the inner carrier pipes 12 and 14 and to the inner surface of the external containment pipes 16 and 18, respectively, as well as being adhesively bonded to opposite ends of the inner carrier housing 22. It should be appreciated that the position and degree of adhesive contact with the respective surfaces of the coaxially aligned pipes and/or ends of the coaxially aligned fittings, may vary (as illustrated later) provided sufficient adhesively bonded surface area is present such as to hold or restrain the coaxial pipe under a compression/tension mode (i.e., sufficient structural rigidity to transfer tension loading of one pipe into compression loading of the other and vice versa).

Figure 3:
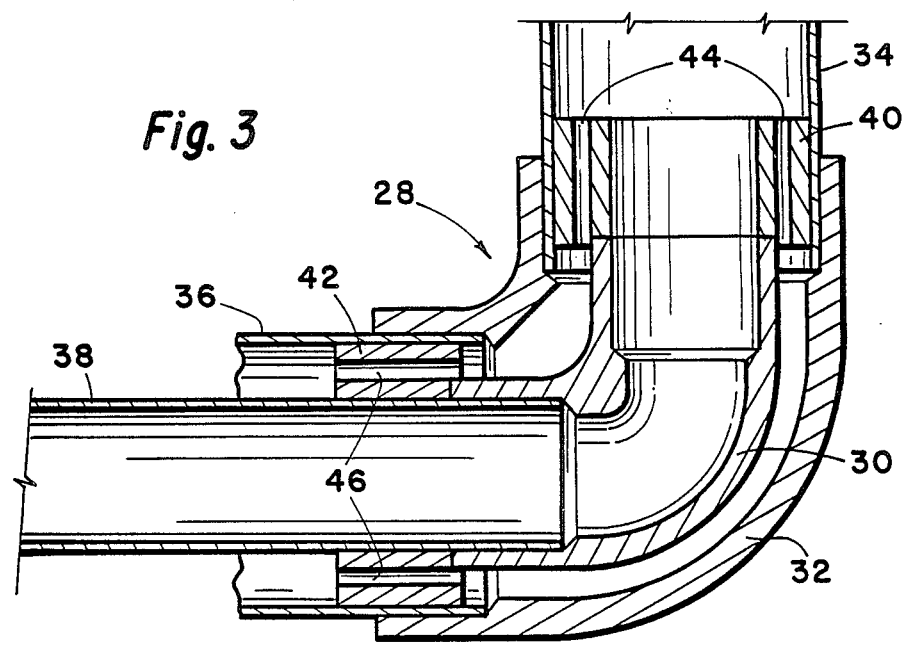
FIG. 3 is a cross-sectional side view of a typical 90° elbow fitting according to the present invention.

FIG. 3 illustrates another double containment 90° elbow fitting 28 according to the present invention as it may typically appear before installation into a double containment pipe system. As illustrated, the fitting 28 has an inner carrier housing 30 and an outer containment housing 32 with a pair of relatively short external pipe segments 34 and 36 extending from opposite ends of the outer containment housing 32. In this illustrated embodiment, a single carrier pipe segment 38 extends from one end of the inner carrier housing 30 yet rigid centering rings 40 and 42 are adhesively present, one at each end of the fitting 28. In this particular embodiment, the rigid centering rings 40 and 42 are also perforated with openings 44 and 46 such as to establish fluid flow from the annulus between the outer containment housing 32 and inner carrier housing 30 and the annulus between the carrier pipe and containment pipe on either side of the fitting 28. Because of the presence of one of the inner carrier pipe segments at one end of the fitting 28, the fitting can be readily employed during assembly and installation of the pipe in a manner analogous to the adhesive installation of the double containment pipe sections. It should be appreciated that other variations in the number of ends having the inner carrier pipe present or absent can be employed according to the present invention and as such, should be considered equivalent for purposes of the invention.

Figure 4:
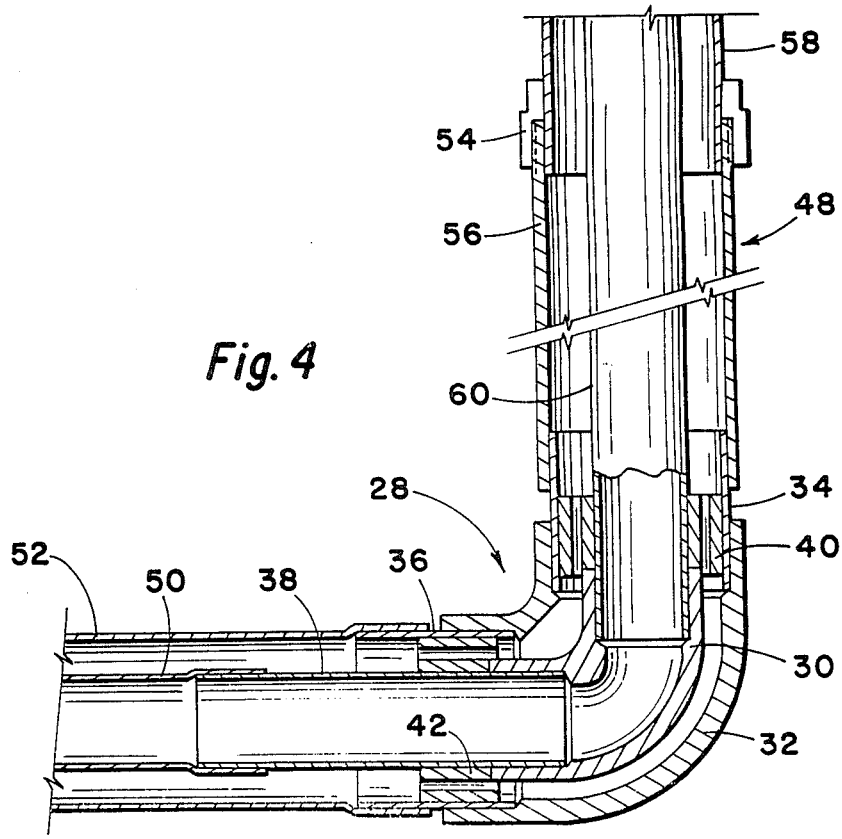
FIG. 4 is a cross-sectional side view of the 90° elbow fitting of FIG. 3 after being installed in a double containment pipe system further illustrating the make-up fitting used to adhesively close the exterior confinement pipe.

FIG. 4 illustrates the fitting 28 of FIG. 3 after being installed into a double containment pipe system and also illustrates the use of the make-up fitting 48 according to the present invention. As shown in the lower left portion of FIG. 4, the fitting 28 can be incorporated into the double containment pipe system in a conventional manner by adhesively bonding a carrier pipe section 50 to the carrier pipe segment 38 of fitting 28. An external containment pipe section 52 can then be concentrically sleeved over the carrier pipe 50 and adhesively bonded to the external pipe segment 36 of the fitting 28. The double containment pipe system can then be extended in a conventional manner including the use of internal spacers and external hangers (not shown), all as generally known in the art.

The upper right portion of FIG. 4 illustrates how the fitting 28 is installed or mated to a double containment pipe system as the pipe system is closed from two different directions. This particular aspect or feature of the invention is also useful in closing a double containment pipe system that has been opened for repair or the like. As illustrated, a make-up fitting 48 is used to close the external containment pipe around the inner carrier pipe. As such, the make-up fitting 48 involves compression nuts 54 and a slightly oversized external containment pipe segment 56 corresponding in length to the distance that must be closed. Initially (before adhesively installing the inner carrier pipe to the fitting), the compression nut 54 and threaded pipe segment 56 are sleeved over the external containment pipe section 58. The inner carrier pipe section 60 is then adhesively bonded to the center ring 40 and corresponding open end of inner housing 30. The pipe segment 56 can then be advanced toward the fitting 28 and adhesively bonded to the external containment pipe segment 34 extending from fitting 28. With the compression nut 54 separated from the other threaded end of pipe segment 56, an appropriate amount of adhesive is applied at the open end of the threads and/or with the compression nut. The compression nut is then threaded onto the threaded end of the pipe segment 56. This in turn forces the adhesive between the pipe section 58 and pipe segment 56 as well as between the nut 54 and respective pipes, thus creating an adhesive joint at the compression nut sealing the containment pipe.

Figure 5:
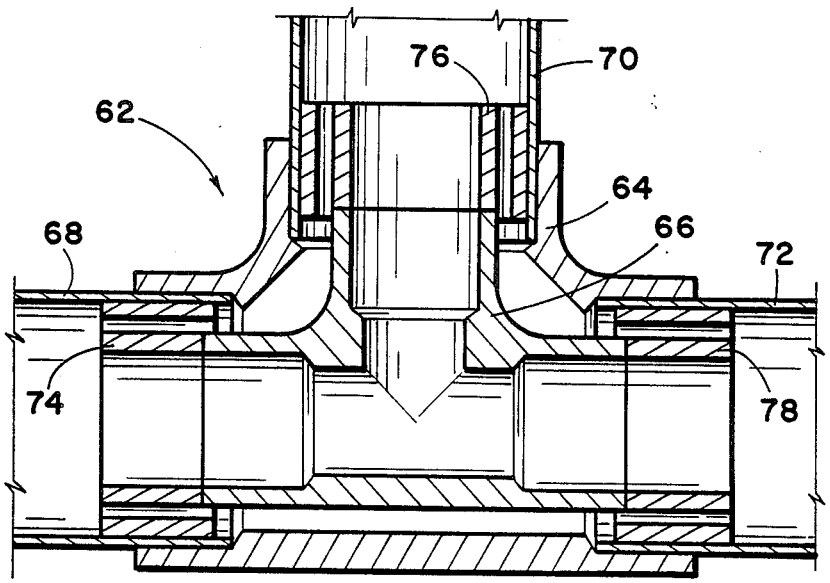
FIG. 5 is a cross-sectional side view of a T fitting according to the present invention.
Figure 6:
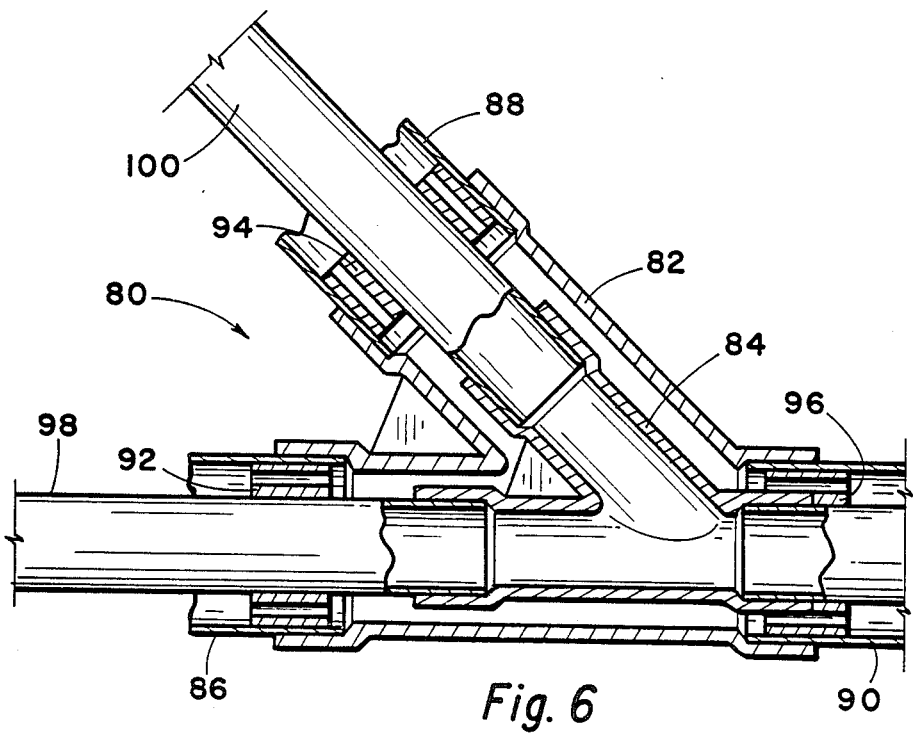
FIG. 6 is a cross-sectional side view of a lateral fitting according to the present invention.

FIGS. 5 and 6 illustrate other double containment fittings according to the present invention. In FIG. 5, a T-fitting 62 is illustrated. Again, the fitting 62 is made up of an outer containment tee housing 64 and an inner carrier tee housing 66. At each of the openings of the T-fitting 62 are short external containment pipe segments 68, 70 and 72 adhesively bonded to the outer containment tee housing 64. Within each pipe segment 68, 70 and 72 are rigid centering rings 74, 76 and 78, respectively, adhesively bonded to the pipe segment and inner carrier tee housing 66. In this particular embodiment, the interior diameter of the rigid centering rings and end of the inner carrier tee housing are sized to accept the inner carrier pipe during installation. Again, these openings could optionally contain inner carrier pipe segments as illustrated in FIG. 3.

FIG. 6 illustrates a double containment lateral fitting 80 having an outer containment lateral housing 82, an inner carrier lateral housing 84, three short external containment pipe segments 86, 88 and 90, three rigid centering rings 92, 94 and 96 and a pair of inner carrier pipe segments 98 and 100. In this particular embodiment, the preassembled fitting 80 has two of the rigid centering rings 92 and 94 displaced away from the openings in the inner carrier lateral housing 82 and the third rigid centering ring 96 adhesively bonded to the third opening in the carrier housing 82. As such, the transfer of compression/tension loading at two ends of the fitting takes place by virtue of the centering rings 92 and 94 being adhesively bonded to the inner surface of the containment pipes 86 and 88 and the outer surface of the carrier pipes 98 and 100.

The actual construction of the double containment fitting can be out of any structural plastic as generally known in the art. Preferably, the fittings are molded out of a fiber reinforced plastic such as a fiber reinforced vinyl ester or epoxy resins. The individual elements making up the fitting can be preferably compression or injection molded then adhesively assembled. In the case of the 90° elbow of FIG. 1, the assembly involves insertion of the inner carrier housing within the outer containment housing and then adhesively bonding the pipe segments and center rings in place. In contrast, the outer containment housing in FIGS. 5 and 6 have to be split before encasing the inner carrier tee or lateral housing. The split containment housing is then adhesively glued and preferably wrapped with a fiber reinforced resin during assembly of the fitting. Preferably, all adhesively bonded joints are premachined, advantageously with a slight reverse taper to remove any glaze and insure the proper fit before final assembly. Similarly, the threaded end of the make-up fitting can intentionally have a slight reverse taper to insure proper compressive delivery of the adhesive and adequate bonding.

The pipe to be employed in the present invention can generally be any rigid plastic piping as generally known in the art. Preferably, the pipe is a centrifugally cast fiber reinforced plastic pipe such as described in U.S. Pat. Nos. 4,018,250 and 3,718,161, herein incorporated by reference for descriptive purposes.

The advantages and benefits of the use of the double containment fittings and make-up fitting according to the present invention are considered numerous and significant. First and foremost, experience indicates that the fittings of the present invention readily achieve the necessary mechanical, structural and operational characteristics consistent with the overall double containment pipe system. The double containment pipe fittings are also easily manufactured and assembled and conveniently installed or repaired, again consistent with conventional practices employed in double containment pipe art. Furthermore, the double containment fitting according to the present invention accomplishes the above while also providing compression/tension restraint at all ends of the fitting, a concept felt to be heretofore unavailable in a full adhesively bonded fiber reinforced plastic double containment pipe system.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:

1. A double containment pipe fitting made of fiber reinforced vinyl ester resin comprising:
    (a) an outer containment housing with a plurality of open ends wherein the internal diameter of each of said open ends are sized such as to accept and adhesively bond to segments of external containment pipe;
    (b) an inner carrier housing with a plurality of open ends adapted to insert within and coaxially align with said outer containment housing and wherein said plurality of open ends of said inner carrier housing are sized such as to accept and adhesively bond to segments of inner carrier pipe when positioned coaxial to external containment pipe;
    (c) a plurality of external containment pipe segments adhesively bonded to each of said plurality of open ends of said outer containment housing; and
    (d) a plurality of rigid centering ring means, one for each of said plurality of external containment pipe segments, said ring means being adhesively bonded to said outer containment housing and one of said external containment pipes and said inner carrier housing, and for adhesively bonding to an inner carrier pipe, thus producing a restraint fitting.

2. A double containment pipe fitting of claim 1 further comprising at least one inner carrier pipe segment adhesively bonded to one of said plurality of open ends of said inner carrier housing.

3. A double containment pipe fitting of claim 1 further comprising a plurality of inner carrier pipe segments each adhesively bonded to one of said plurality of open ends of said inner carrier housing.

4. A double containment pipe fitting of claim 3 wherein each of said rigid centering ring means are adhesively bonded to the interior diameter of one of said containment pipe segments and adhesively bonded to one of said open ends of said inner carrier housing and the exterior diameter of said inner carrier pipe segment of said open end of said inner carrier housing.

5. A double containment pipe fitting of claim 3 wherein said rigid centering ring means have at least one opening therethrough such as to establish fluid communication from the annulus between said outer containment housing and inner carrier housing to the annulus between said external containment pipe segment and inner carrier pipe segment.

6. A double containment pipe fitting comprising:
    (a) an outer containment housing with a plurality of open ends wherein the internal diameter of each of said open ends are sized such as to accept and adhesively bond to segments of external containment pipe;
    (b) an inner carrier housing with a plurality of open ends adapted to insert within and coaxially align with said outer containment housing and wherein said plurality of open ends of said inner carrier housing are sized such as to accept and adhesively bond to segments of inner carrier pipe when positioned coaxial to external containment pipe;
    (c) a plurality of external containment pipe segments adhesively bonded to each of said plurality of open ends of said outer containment housing;
    (d) a plurality of rigid centering ring means, one for each of said plurality of external containment pipe segments, said ring means being adhesively bonded to said outer containment housing and one of said external containment pipes and said inner carrier housing, and for adhesively bonding to an inner carrier pipe, thus producing a restraint fitting.
    (e) a plurality of inner carrier pipe segments each adhesively bonded to one of said plurality of open ends of said inner carrier housing;
    (f) a make-up pipe segment adapted to adhesively bond at one end to one of said external containment pipe segments and further internally sized and adapted at the other end to accept and adhesively bond to another section of external containment pipe wherein the outer diameter of said other end is externally threaded; and (g) a compression nut means for slipping over the external containment pipe section and threadably engaging said threaded other end of said make-up pipe and for receiving and compressively advancing adhesive into and between said other end of said make-up pipe and the section of external containment pipe as said compression nut means is threaded onto said threaded other end of said make-up pipe.

7. A double containment pipe fitting made of fiber reinforced epoxy resin comprising:
 (a) an outer containment housing with a plurality of open ends wherein the internal diameter of each of said open ends are sized such as to accept and adhesively bond to segments of external containment pipe;
 (b) an inner carrier housing with a plurality of open ends adapted to insert within and coaxially align with said outer containment housing and wherein said plurality of open ends of said inner carrier housing are sized such as to accept and adhesively bond to segments of inner carrier pipe when positioned coaxial to external containment pipe;
 (c) a plurality of external containment pipe segments adhesively bonded to each of said plurality of open ends of said outer containment housing; and
 (d) a plurality of rigid centering ring means, one for each of said plurality of external containment pipe segments, said ring means being adhesively bonded to said outer containment housing and one of said external containment pipes and said inner carrier housing, and for adhesively bonding to an inner carrier pipe, thus producing a restraint fitting.

8. A double containment pipe fitting of claim 7 further comprising at least one inner carrier pipe segment adhesively bonded to one of said plurality of open ends of said inner carrier housing.

9. A double containment pipe fitting of claim 7 further comprising a plurality of inner carrier pipe segments each adhesively bonded to one of said plurality of open ends of said inner carrier housing.

10. A double containment pipe fitting of claim 9 wherein each of said rigid centering ring means are adhesively bonded to the interior diameter of one of said containment pipe segments and adhesively bonded to one of said open ends of said inner carrier housing and the exterior diameter of said inner carrier pipe segment of said open end of said inner carrier housing.

11. A double containment pipe fitting of claim 9 wherein said rigid centering ring means have at least one opening therethrough such as to establish fluid communication from the annulus between said outer containment housing and inner carrier housing to the annulus between said external containment pipe segment and inner carrier pipe segment.

* * * * *